United States Patent [19]

Chan et al.

[11] Patent Number: 5,250,109
[45] Date of Patent: Oct. 5, 1993

[54] DERIVATIVES OF POLYOXYALKYLENEAMINES AS COSOLVENTS FOR AQUEOUS INK JET INKS

[75] Inventors: Dominic M. Chan, Wilmington, Del.; Howard Matrick, Highlands, N.J.; Glenn M. Russo, Mullica Hill, N.J.

[73] Assignee: E. I. Du Pont de Nemours and Company, Wilmington, Del.

[21] Appl. No.: 994,841

[22] Filed: Dec. 22, 1992

[51] Int. Cl.$^5$ .............................................. C09D 11/02
[52] U.S. Cl. .................................. 106/22 H; 106/20 R
[58] Field of Search ................. 106/20 R, 22 R, 22 H

[56] References Cited

U.S. PATENT DOCUMENTS

| 4,508,570 | 4/1985 | Fujii et al. | 106/20 D |
| 5,019,164 | 5/1991 | Tomita et al. | 106/20 R |
| 5,129,948 | 7/1992 | Breton et al. | 106/22 H |
| 5,149,367 | 9/1992 | Reuter et al. | 106/22 H |
| 5,151,128 | 9/1992 | Fukushima et al. | 106/20 R |
| 5,156,675 | 10/1992 | Breton et al. | 106/20 D |
| 5,174,815 | 12/1992 | Kondo et al. | 106/20 R |

Primary Examiner—Helene Klemanski

[57] ABSTRACT

Aqueous ink jet ink compositions comprising an aqueous carrier medium, a colorant, and cosolvents which are selected amide, sulfonamide, urea and thiourea derivatives of polyoxyalkyleneamines having a solubility in water of at least 4.5% at 25° C., have high optical density, excellent print quality, excellent dispersion stability, and resist film formation on resistors without adversely affecting decap time or crusting.

18 Claims, No Drawings

DERIVATIVES OF POLYOXYALKYLENEAMINES AS COSOLVENTS FOR AQUEOUS INK JET INKS

FIELD OF THE INVENTION

This invention relates to aqueous inks for ink jet printers. More particularly, this invention relates to aqueous ink jet inks having improved print quality.

BACKGROUND OF THE INVENTION

Ink jet printing is a non-impact printing method that produces droplets of ink that are deposited on a substrate such as paper or transparent film in response to an electronic digital signal. Thermal or bubble jet drop-on-demand ink jet printers have found broad application as output devices for personal computers in the office and the home.

A great concern with ink jet printing, especially on "plain paper," is print quality. The term "plain paper," as it is commonly understood, means a broad set of commercial papers, especially those available for use in electrographic copying, that do not rely on a unique structure, composition, or narrow set of properties such that the ink jet printer can only use this one specific type of paper. In recent years, there has been an increasing demand in the marketplace for plain paper printing devices.

Print quality can be defined as the image definition or contrast verses the nonimage background areas. It is controlled by 2 general factors:

1) Color properties of the ink which are measured by optical density and color coordinates controlling hue, e.g., $L^*$, $A^*$ and $B^*$ in the CIELAB 1976 color standards. In the case of black inks the optical density is the most important of these two factors.

2) Non-color image characteristics which determine the definition of the image are:
   a) resolution, i.e., number of drops of ink per unit area;
   b) the area coverage per drop;
   c) edge acuity or sharpness; and
   d) extent of presence of artifacts such as satellite droplets, side pennants or feathering.

The ink jet inks of this invention produce high optical densities and give images of high definition free of artifacts such as feathering. In addition, the inks of this invention impart this excellent print quality in both dye and pigment-based inks and, with respect to the latter, without deleterious effects on pigment dispersion stability. The inks of this invention also impart freedom from film formation on the nozzle resistors in pigmented inks and do not adversely affect other ink properties such as decap time or crusting.

These results are surprising and unexpected because the polyoxyalkyleneamines themselves are poor cosolvents for aqueous ink jet inks. They produce low optical densities, cause flocculation of pigment dispersions and induce blockage of pen nozzles.

SUMMARY OF THE INVENTION

In accordance with this invention, there is provided an aqueous ink jet ink composition comprising:
(a) an aqueous carrier medium;
(b) a colorant selected from the group consisting of a pigment dispersion and a dye; and
(c) a cosolvent having a solubility in water of at least 4.5% at 25° C., and which is selected from the group of:
(1) Monocarboxamide, monosulfonamide, monourea and monothiourea derivatives of polyoxyalkylene monoamines having the following structure:

wherein
R=—H or an alkyl group of 1–4 carbons;
R'=—H, an alkyl group of 1–3 carbons, or an alkyl group of 1–4 carbons containing one hydroxyl group;
X=—H or —CH$_3$ independently;
n=1–200;
R"=an alkyl group of 1–4 carbons; and
Y is a divalent connecting group of atoms selected from the group consisting of:

 (A)

 (B)

 (C)

 (D)

(2) Bis-carboxamide, bis-sulfonamide, bis-urea and bis-thiourea derivatives of polyoxyalkylenediamines having the following structure:

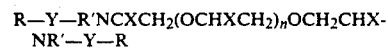

wherein
R, R', X, and Y are as defined above; and
n=2–400;

(3) Tris-carboxamide, tris-sulfonamide, tris-urea and tris-thiourea derivatives of polyoxyalkylenetriamine having the following structure:

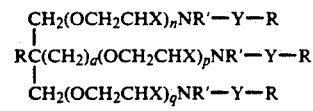

wherein
R, R', X, and Y are as defined above;
n+p+q=3–500; and
a=0 or 1;

(4) Monourea, monosulfonamide and monothiourea derivatives of bis-polyoxyalkyleneamines having the following structure:

wherein
R, R', and X are as defined above;
n=1–200;

R″=an alkyl group of 1–3 carbons; and
Y is a divalent connecting group of atoms selected from the group of:

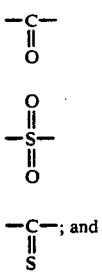

(5) Mixtures thereof.

The ink compositions have high optical density and excellent print quality. In addition, pigmented inks containing these cosolvents have excellent dispersion stability.

DETAILED DESCRIPTION OF THE INVENTION

The ink jet ink compositions of this invention are particularly suited for use in ink jet printers in general, and thermal ink jet printers in particular. The ink jet ink compositions encompasses both pigment and dye colorant inks. The inks may be adapted to the requirements of a particular ink jet printer to provide a balance of light stability, smear resistance, viscosity, surface tension, decap time, low toxicity, high material compatibility and acceptable drying rate. The cosolvents of this invention are especially resistant to hydrolysis in aqueous inks and are essentially odor-free.

AQUEOUS CARRIER MEDIUM

The aqueous carrier medium is water or a mixture of water and at least one water soluble organic solvent other than the selected derivatives of polyoxyalkyleneamine compounds. Deionized water is commonly used.

Selection of a suitable mixture of water and water soluble organic solvent depends upon requirements of the specific application, such as desired surface tension and viscosity, the selected colorant and the drying time of the ink.

Water-soluble organic solvents are well known, representative examples of which are disclosed in U.S. Pat. No. 5,085,698, the disclosure of which is incorporated herein by reference. A mixture of a water soluble organic solvent having at least 2 hydroxyl groups, e.g, diethylene glycol, and deionized water is preferred as the aqueous carrier medium. In the event that a mixture of water and organic solvent is used as the aqueous carrier medium, water would comprise between 25% and 99%, preferably 45% to 95%, by weight of the aqueous medium, based on the total combined weight of the aqueous carrier medium plus the polyoxyalkyleneamine cosolvent compounds of this invention.

COLORANTS

The colorants useful in the present invention may be a pigment dispersion or a dye. A pigment is a colorant that is applied in an insoluble particulate state. A dye is a colorant that is applied in a soluble state. The term pigment dispersion, as is known in the art and as used herein, refers to a mixture of a pigment and a dispersing agent. Preferably, the dispersing agent is a polymeric dispersant compound.

Pigments

Useful pigments for the dispersion comprise a wide variety of organic and inorganic pigments, alone or in combination. The pigment particles are sufficiently small to permit free flow of the ink through the ink jet printing device, especially at the ejecting nozzles. Small particles are also desirable for dispersion stability and maximum color strength. The range of useful particle size is approximately 0.005 micron to 15 micron. Preferably, the pigment particle size should range from 0.005 to 5 micron and most preferably, from 0.01 to 0.4 micron.

The selected pigment may be used in dry or wet form. Representative commercial dry and presscake pigments that may be used in practicing the invention, including metals and metal oxides, are disclosed in the aforementioned U.S. Pat. No. 5,085,698, which is incorporated herein by reference.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments.

Polymeric dispersants are the preferred dispersants for pigments. Polymeric dispersants suitable for practicing the invention include random copolymers and AB, BAB or ABC block copolymers. Because random copolymers are not as effective in stabilizing pigment dispersions as the block copolymers, they are not preferred.

In AB or BAB block copolymers the A segment is a hydrophobic (i.e., water insoluble) homopolymer or copolymer which serves to link with the pigment and the B block is a hydrophilic (i.e., water soluble) homopolymer or copolymer, or salts thereof, and serves to disperse the pigment in the aqueous medium. Such polymeric dispersants and the synthesis thereof are disclosed in the aforementioned U.S. Pat. No. 5,085,698, the disclosure of which is incorporated herein by reference.

In the ABC triblock copolymers, the A block is a polymer compatible with water, the B block is a polymer capable of binding to the pigment and the C block is compatible with the organic solvent component of the ink. The A and C blocks are end blocks. ABC triblocks and their synthesis are disclosed in Ma et al., U.S. application Ser. No. 07/838,181 filed Feb. 20, 1992, the disclosure of which is incorporated herein by reference.

In addition to, or in place of the polymeric dispersant compounds, surfactant compounds may be used as dispersants as is well known in the art. The block polymer dispersants are present in the range of approximately 0.1 to 20% by weight of the total ink composition, preferably in the range of 0.1 to 8% by weight.

Dyes

Dyes useful in this invention include anionic, cationic, amphoteric and non-ionic dyes. Such dyes are well known to those of ordinary skill in the art. Anionic dyes are those dyes which in aqueous solution yield colored anions and cationic dyes are those which in aqueous solution yield colored cations. Typically anionic dyes contain carboxylic or sulfonic acid groups as the ionic moiety. Cationic dyes usually contain quaternary nitrogen groups.

The types of anionic dyes most useful in this invention are for example Acid, Direct, Food, Mordant, and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The types of cationic dyes that are most useful in this invention include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known to those skilled in the art.

The color and amount of dye used in the ink composition is largely a function of choice, being primarily dependent upon the desired color of the print achieved with the ink, the purity of the dye and its strength. The dye is typically present in the amount of 0.01 to 20%, by weight, preferably 0.05 to 8%, more preferably 1 to 5%, based on the total weight of the ink.

POLYOXYALKYLENEAMINE DERIVATIVES

The polyoxyalkyleneamine derivative cosolvents have a solubility in water of at least 4.5% (4.5 parts cosolvent in 100 parts of water) at 25° C. and are selected from the group of compounds having the structures defined above, or mixtures of such compounds.

The polyoxyalkylene moiety may be a homopolymer such as polyoxyethylene or polyoxypropylene or it may be a copolymer. The copolymer may be random or arranged in blocks as AB, ABA or BAB where A is a polyoxyethylene block and B is a polyoxypropylene block. In another arrangement, only the terminal monomer contains a second monomer, usually oxypropylene. In the above-mentioned structural formulas, where X represents —H for a polyoxyethylene and —CH$_3$ for polyoxypropylene, 50–100 mole % of oxyethylene units are preferred, more preferred are 65–100 mole %, and most preferred are 80–100 mole %. In pigmented inks, the preferred polyalkyleneamines are richer in polyoxyethylene groups rather than polyoxypropylene groups, because the former are most compatible with pigment dispersions.

The polyoxyalkyleneamines derivative cosolvents are prepared by reacting the amino groups of a polyoxyalkyleneamine with derivatizing reactants. The derivatizing reactants may be mono- or difunctional. The polyoxyalkyleneamines themselves are mono-, di- or tri-functional, i.e. monoamines, diamines or triamines. Generally speaking, the polyoxyalkyleneamines derivative cosolvents disclosed herein can be classified into four types (i.e., (1)–(4) recited above), based on their method of preparation:

Type (1) is prepared from a monoamine and a monofunctional derivatizing reactant;

Type (2) is prepared from a diamine and 2 moles of a monofunctional derivatizing reactant;

Type (3) is prepared from a triamine and 3 moles of a monofuctional derivatizing reactant; and Type (4) is prepared from a 2 moles of a monoamine and one mole of a difunctional derivatizing reactant.

As the polyoxyalkyleneamine, polyoxyethyleneamine or polyoxypropyleneamine or copolymers thereof are suitable. Particularly preferred are the Jeffamines ® brand of polyoxyalkylamines which are commercially available from Texaco Chemical Company, Athens, N.Y. Most preferred are the Jeffamines ® M-600, M-715, M-1000, M-2005, M-2070, D-230, D-400, D-2000, D-4000, ED-600, ED-900, ED-2001, ED-4000, ED-6000, T-403, T-3000 AND T-5000, EDR-148, EDR-192 and C-346.

The Jeffamines ® in the M-series have the following general structure:

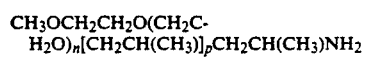

Specific examples of Jeffamines ® in this series are set forth below.

| JEFFAMINE ® M-SERIES | | |
|---|---|---|
| Designation | n | p |
| M-600 | 0 | 9 |
| M-1000 | 18 | 3 |
| M-2005 | 2 | 32 |
| M-2070 | 31 | 10 |

The Jeffamines ® in the ED-series have the following structure:

where a+c+1 are the number of mole units of oxypropylene groups and b are the number of mole units of oxyethylene groups. Specific examples are identified below.

| JEFFAMINE ® ED-SERIES | | |
|---|---|---|
| Designation | b | a + c + 1 |
| ED-600 | 8.5 | 3.5 |
| ED-900 | 15.5 | 3.5 |
| ED-2001 | 40.5 | 3.5 |
| ED-4000 | 86.0 | 3.5 |
| ED-6000 | (not disclosed by Texaco) | |

Compounds in the Jeffamine ® D-series have the general structure:

where n is the number of moles of oxypropylene units. Examples include:

| JEFFAMINE ® D-SERIES | |
|---|---|
| Designation | n |
| D-230 | 2–3 |
| D-400 | 5–6 |
| D-2000 | 33 |
| D-4000 | 60 |

The T-series Jeffamines® have the general structure:

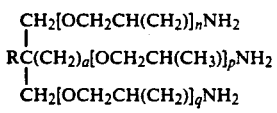

where n+p+q is the number of moles of oxypropylene units, R=—H or —CH$_2$CH$_3$ and a=0 or 1. Examples of T-series Jeffamines® are:

| JEFFAMINE® T-SERIES | | | |
|---|---|---|---|
| Designation | n + p + q | a | R |
| T-403 | 5–6 | 1 | —CH$_2$CH$_3$ |
| T-5000 | 85 | 0 | —H |

Jeffamines® in the EDR-series have the structure:

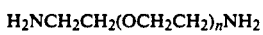

where n is the number of moles of oxyethylene units.

| JEFFAMINE® EDR-SERIES | |
|---|---|
| Designation | n |
| EDR-148 | 2 |
| EDR-192 | 3 |

Jeffamine® C-346 has the structure:

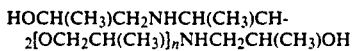

where n=2.6

Preparation of the polyoxyalkyleneamines using a single alkylene oxide actually produce mixtures of compounds with varying degree of oxyalkylation so that the structures disclosed are often based on average compositions which contain a range of oxyalkylene units.

Derivatizing Reactants

As already mentioned, the polyoxyalkyleneamine derivatives are prepared by reacting the polyoxyalkylene with a derivatizing reactant, which reactants can be either monofunctional or difunctional.

The monofuctional derivatizing reactants are of four types i) Carboxylic Acids

These may be the acids themselves, acid anhydrides (e.g., acetic anhydride) or acid halides (e.g., acetyl chloride). This type of reactants can be derived from formic, acetic and propionic acids and the various isomers of butanoic and pentanoic acids. An exception is formic anhydride which is not available. These reactants are used to produce the carboxylic acid amides or carboxamides.

ii) Sulfonic Acids Derivatives

These may be acid halides or acid anhydrides, although the former are more common, and can be derived from methanesulfonic acid, ethanesulfonic acid and the various isomers of propane or butane sulfonic acids. These reactants are used to produce sulfonic acid amides or sulfonamides.

iii) Alkyl Isocyanates

In Types (1), (2) and (3) of polyoxyalkyleneamine derivatives where R is an alkyl group of 1–4 carbons, these reactants are methyl isocyanate, ethyl isocyanate, or the various isomers of propyl and butyl isocyanates. Where R is —H in such polyoxyalkyleneamine derivatives, the reactant is a carbamyl halide. The products of the reaction of polyoxyalkyleneamines with isocyanates or carbamyl halides are ureas.

iv) Alkyl Isothiocyanates

For polyoxyalkyleneamine derivatives of Types (1), (2), or (3), where R is an alkyl group of 1–4 carbons, these reactants are methyl isothiocyanate, ethyl isothiocyanate, or the various isomers of propyl and butyl isothiocyanate. The products of the reaction of polyoxyalkyleneamines with isothiocyanates are thioureas.

The difunctional derivatizing reactants can be classified into three types:

i) Carbonyl Derivatives

These reactants are phosgene or 1,1'-carbonyldiimidazole. These reactants produce 1,3-disubstituted ureas.

ii) Sulfonyl Derivatives

This reactant is a sulfuryl halide, which produces N,N'-disubstituted sulfamides.

iii) Thiocarbonyl Derivatives

These reactants are thiophosgene or 1,1'-thiocarbonyldiimidazole. They produce 1,3-disubstituted thioureas.

Some specific examples of polyoxyalkyleneamine derivative cosolvent compounds disclosed herein include the following:

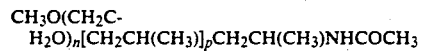

where n=10 and p=32. This compound can be prepared from Jeffamine® M-2070 and acetic anhydride. This is a Type (1) derivative.

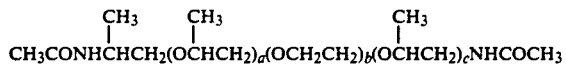

where a+c=2.5 mole units and b=40.5 mole units. This compound can be prepared from Jeffamine® M-2001 and two moles of methyl isocyanate. This is a Type (2) derivative. The polyoxyethylene moiety is in the form of a triblock.

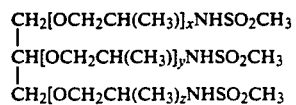

where x+y+z=50 mole units. This compound can be prepared from Jeffamine® T-3000 and three moles of methanesulfonyl chloride. This is a Type (3) derivative.

n=22 and X represents 19 mole units as —H and 3 mole units as —CH$_3$. This compound can be prepared from two moles of Jeffamine ® M-1000 and one mole of 1,1'-carbonyldiimidazole. This is a Type (4) derivative.

The underivatized (i.e., unreacted) polyoxyalkyleneamines are poor cosolvents. Inks made with these materials have low optical density and have poor dispersion stability where the colorant is a pigment dispersion. Likewise, glycerol polyoxyethylene (26) is an inferior cosolvent, both in optical density and dispersion stability.

As little as 1% by weight polyoxyalkyleneamine derivative may have some effect on print quality, but about 3-25% is a useful range. Amounts up to about 35%, 55%, or even 75% based on the total weight of the ink can be used to maximize certain ink properties, but often at the expense of other desirable ink features such as viscosity and drying rate. A particularly preferred range is 3-10% by weight, based on the total weight of ink.

The polyoxyalkyleneamine derivative cosolvents may be chosen for specific inks on the basis of a need for certain physical properties such as boiling point or drying rate with a specific set of ingredients. Mixtures of these cosolvents may also be used to optimize and balance various ink properties.

OTHER INGREDIENTS

The ink may contain other ingredients. For example, the surfactants may be used to alter surface tension as well as maximize penetration. However, they may also destabilize the pigment dispersion for pigmented inks. The choice of a specific surfactant is also highly dependent on the type of media substrate to be printed. It is expected that one skilled in the art can select the appropriate surfactant for the specific substrate to be used in printing. In aqueous inks, the surfactants may be present in the amount of 0.01-5% and preferably 0.2-2%, based on the total weight of the ink.

Biocides may be used in the ink compositions to inhibit growth of microorganisms. Dowicides ® (Dow Chemical, Midland, Mich.), Nuosept ® (Huls America, Inc., Piscataway, N.J.), Omidines ® (Olin Corp., Cheshire, Conn.), Nopcocides ® (Henkel Corp., Ambler, Pa.), Troysans ® (Troy Chemical Corp., Newark, N.J.) and sodium benzoate are examples of such biocides.

In addition, sequestering agents such as EDTA may also be included to eliminate deleterious effects of heavy metal impurities.

Other known additives, such as humectants, viscosity modifiers and other acrylic or non-acrylic polymers made also be added to improve various properties of the ink compositions.

INK PREPARATION

The ink compositions of the present invention are prepared in the same manner as other ink jet ink compositions. If a pigment dispersion is used as the colorant, the dispersion is prepared by premixing the selected pigment(s) and dispersant in water. The dispersion step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium. The polyoxyalkyleneamine derivative cosolvents, as well as other cosolvents, may be present during the dispersion step.

If a dye is used as the colorant, there is no dispersant present and no need for pigment deaggregation. The dye-based ink is prepared in a well agitated vessel rather than in dispersing equipment.

It is generally desirable to make the ink jet inks in concentrated form, which is subsequently diluted with a suitable liquid to the appropriate concentration for use in the ink jet printing system. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the media substrate, such as, paper, fabric, film, etc., can be carried out rapidly and accurately.

The printed ink images have clear color tones, high density, excellent water resistance and lightfastness. Furthermore, the ink does not corrode parts of the ink jet printing device it comes in contact with, and it is essentially odorless.

EXAMPLES

The following examples further illustrate the invention. The parts and percentages are by weight unless otherwise noted.

I. Preparation of Polyoxyalkyleneamine Derivatives

A. Preparation of the Monoacetyl Amide of Jeffamine ® 1000

To a 100 ml. flask equipped with an addition funnel, drying tube, thermometer and mechanical stirrer was added 50 grams of Jeffamine ® M-1000 (Texaco Chemical Company, Athens, N.Y.). To this was added 10 ml of acetic anhydride (Aldrich Chemical Company, Milwaukee, Wis.) dropwise with stirring. The mixture was stirred for about 16 hours at 70° C. and the excess liquid distilled at 0.35 mmHg to give 37.3 grams of an off-white waxy solid.

B. Preparation of the Diacetylamine of Jeffamine ® ED-6000

To a 100 ml flask equipped with an addition funnel, drying tube, thermometer and mechanical stirrer was added 50 gm of Jeffamine ® ED-6000 (Texaco Chemical Co., Athens, N.Y.). Then, 20 ml of acetic anhydride (Aldrich) was added dropwise with stirring. The mixture was refluxed for 24 hours and the excess liquid removed by vacuum distillation to give 50.3 gm (99.1% yield) of an off-white jelly.

C. Preparation of Methyl Urea of Jeffamine ® M-2070

A solution of 50 ml of tetrahydrofuran (Aldrich), 50 gm of Jeffamine ® M-2070 and 3.42 gm methyl isocyanate (Aldrich) was stirred for 24 hours. Tetrahydrofuran and excess methyl isocyanate were removed under vacuum. Upon cooling, a viscous clear liquid resulted giving 47.2 gm (89.3% yield) of the product.

D. Preparation of Urea from two moles of Jeffamine ® M-2070

A solution of 50 ml of tetrahydrofuran, 25 gm of Jeffamine ® M-2070 and 1.01 gm of 1,1'-carbonyldiimidizole (Aldrich) was refluxed for 24 hours. The tetrahydrofuran was removed under vacuum. Upon cooling, a viscous clear liquid resulted giving 25.9 gm (99.6% yield) of the product.

II. Preparation of Ink Ingredients and Inks

A. Preparation of Polymeric Dispersant and Neutralized Solution

A block copolymer of n-butyl methacrylate and methacrylic acid was prepared by adding 3750 grams of tetrahydrofuran and 7.4 grams of p-xylene to a 12-liter flask equipped with a mechanical stirrer, thermometer, nitrogen inlet, drying tube outlet and addition funnels. Feed I, which consisted of 3.0 ml of a 1.0 M solution of tetrabutyl ammonium m-chlorobenzoate catalyst in acetonitrile, was started at 0 minutes and added over 150 minutes and 291.1 gm (1.25 mole) of an initiator, 1,1-bis(trimethylsiloxy-2-methyl propene), was injected. Feed II, which consisted of 1976 gm (12.5 M) trimethylsilyl methacrylate, was started at 0 minutes and added over 35 minutes. One hundred eighty minutes after Feed II was completed (over 99% of the monomers had reacted), Feed III, which consisted of 1772 gm (12.5 M) butyl methacrylate, was started and added over 30 minutes.

At 400 minutes, 780 grams of dry methanol were added to the above solution and distillation commenced. During the first stage of distillation, 1300.0 grams of material with a boiling point below 55° C. were removed from the flask. The theoretical amount of methoxytrimethylsilane, having a boiling point of 54° C., to be removed was 1144.0 grams. Distillation continued during the second stage while the boiling point increased to 76° C. 5100 grams of isopropanol were added during the second stage of distillation. A total of 7427 grams of solvent were removed.

The resultant resin solution contained 55.8% solids and had a neutralization equivalent of 4.65 milliequivalents of potassium hydroxide per gram of solids. The resin was neutralized by adding to a 1000 ml cylindrical polyethylene bottle:
  200.0 grams dispersant solution
  174.4 grams 15% potassium hydroxide
  137.6 grams deionized water
The mixture was tumbled on a roller mill for 3-4 hours and then magnetically stirred for 16-20 hours to give a slightly cloudy solution.

B. Preparation of Pigment Dispersion

The following materials were added to a 1 liter beaker:
  78.3 grams deionized water
  66.7 grams neutralized polymeric dispersant solution
  3.0 grams 15% potassium hydroxide
The solution was mechanically stirred while 20.0 grams of carbon black pigment, FW 18 (Degussa Corp., Ridgefield Park, N.J.) were added slowly while stirring was continued for 30 minutes. The mixture was then added to a Mini Motormill 100 (Eiger Machinery Inc., Bensenville, Ill.) with another 32 grams of deionized water as a rinse. The contents were milled at 3500 rpm for one hour. The yield was 190.8 grams. The pH was 7.6. The particle size was 138 nm as determined by a Brookhaven BI-90 Particle Analyzer (Brookhaven Instruments Corp., Holtsville, N.Y.).

C. Ink Formulation

Using the 22.5 grams of pigment dispersion from the above procedures, a series of aqueous inks were prepared by combining 2.6 grams diethylene glycol (Aldrich Chemical Co. Inc., Milwaukee, Wis.), 0.5 grams Silwet ® L-77 (Union Carbide Corp., Danbury, Conn.), 37.2 grams deionized water and 2.6 grams of a cosolvent identified in Table 1 with magnetic stirring over a period of 10-15 minutes.

TABLE 1

| Sample No. | Cosolvent Name | Source |
|---|---|---|
| 1 | Liponic ® EG-1[1] | A |
| 2 | Jeffamine ® M-1000 | B |
| 3 | Jeffamine ® M-2005 | B |
| 4 | Jeffamine ® M-2070 | B |
| 5 | Monoacetylamide of Jeffamine ® M-1000 | C |
| 6 | Diacetylamide of Jeffamine ® ED-6000 | C |
| 7 | 1,3-Urea from 1,1'-Carbonyldiimidazole[2] and Jeffamine ® M-2070 | C |

[1]Trade name for glycerol polyoxyethylene 26
[2]1,1'-Carbonyldiimidazole supplied by Aldrich Chemical Co., Milwaukee WI
A = Lipo Chemical Co., Paterson, NJ
B = Texaco Chemical Company, Athens, NY.
C = Laboratory Preparation from above.

Optical Density

Optical Density was determined with a Hewlett Packard Deskjet printer using a 4-pass mode that produces four solid patches of print, each measuring 3 inches square, on Gilbert ® Bond paper (Mead Corp). The optical density of each patch was read with a Macbeth ® RD918 Densitometer and the readings were averaged. High optical densities are indicative of better print quality. Results are reported in Table 2.

Dispersion Stability

Dispersion stability was obtained by subjecting 15 grams of ink to four temperature cycles, each cycle consisting of four hours at −20° C. and four hours at +60° C. Particle sizes were measured on a Brookhaven BI-90 Particle Size Analyzer (Brookhaven Instruments Corp., Holtsville, N.Y.) before and after cycling and the change in particle size was calculated. A more stable dispersion is indicated by a smaller change in particle size. Results are reported in Table 3.

TABLE 2

| Sample No. | Optical Density |
| --- | --- |
| 1 (control) | 1.39 |
| 2 (control) | 1.16 |
| 3 (control) | 1.00 |
| 4 (control) | 1.14 |
| 5 (inventive) | 1.43 |
| 6 (inventive) | 1.49 |
| 7 (inventive) | 1.43 |

TABLE 3

| Sample No. | Change in Particle Size, (delta nanometers) |
| --- | --- |
| 1 (control) | 20 |
| 2 (control) | 21 |
| 3 (control) | 136 |
| 4 (control) | 42 |
| 5 (inventive) | 3 |
| 6 (inventive) | 10 |
| 7 (inventive) | 3 |

What is claimed is:

1. An aqueous ink jet ink composition comprising:
   (a) an aqueous carrier medium;
   (b) a colorant selected from the group consisting of a pigment dispersion and a dye; and
   (c) a cosolvent having a solubility in water of at least 4.5% at 25° C., and which is selected from the group consisting of:
   (1) Monocarboxamide, monosulfonamide, monourea and monothiourea derivatives of polyoxyalkylene monoamines having the following structure:

$$R-Y-NR'CHXCH_2(OCHXCH_2)_nOR''$$

wherein
   R=—H or an alkyl group of 1-4 carbons;
   R'=—H, an alkyl group of 1-3 carbons, or an alkyl group of 1-4 carbons containing one hydroxyl group;
   X=—H or —CH$_3$ independently;
   n=1-200;
   R''=an alkyl group of 1-4 carbons; and
   Y is a divalent connecting group of atoms selected from the group consisting of:

$$-\underset{\underset{O}{\|}}{C}-  \quad (A)$$

$$-\underset{\underset{O}{\|}}{\overset{\overset{O}{\|}}{S}}-  \quad (B)$$

$$-NH\underset{\underset{O}{\|}}{C}-  \quad (C)$$

$$-NH\underset{\underset{S}{\|}}{C}-  \quad (D)$$

(2) Bis-carboxamide, bis-sulfonamide, bis-urea and bis-thiourea derivatives of polyoxyalkylenediamines having the following structure:

$$R-Y-R'NCXCH_2(OCHXCH_2)_nOCH_2CHX-NR'-Y-R$$

wherein
   R, R', X, and Y are as defined above; and
   n=2-400;
   (3) Tris-carboxamide, tris-sulfonamide, tris-urea and tris-thiourea derivatives of polyoxyalkylenetriamines having the following structure:

$$\begin{array}{l} CH_2(OCH_2CHX)_nNR'-Y-R \\ | \\ RC(CH_2)_a(OCH_2CHX)_pNR'-Y-R \\ | \\ CH_2(OCH_2CHX)_qNR'-Y-R \end{array}$$

wherein
   R, R', X, and Y are as defined above;
   n+p+q=3-500; and
   a=0 or 1;
   (4) Monourea, monosulfonamide and monothiourea derivatives of bis-polyoxyalkyleneamines having the following structure:

$$R''O(CH_2CHXO)_nCH_2CHX-NR'-Y-NR'CHXCH_2(OCHXCH_2)_nOR''$$

wherein
   R, R', and X are as defined above;
   n=1-200;
   R''=an alkyl group of 1-3 carbons; and
   Y is a divalent connecting group of atoms selected from the group of:

$$-\underset{\underset{O}{\|}}{C}-  \quad (A)$$

$$-\underset{\underset{O}{\|}}{\overset{\overset{O}{\|}}{S}}-  \quad (B)$$

$$-\underset{\underset{S}{\|}}{C}-;  \text{ and} \quad (C)$$

(5) mixtures thereof.

2. The ink composition of claim 1, wherein said colorant is a pigment dispersion comprising a pigment and a dispersant.

3. The ink composition of claim 2, wherein the dispersant comprises a block copolymer, said ink composition comprises approximately 0.1 to 8% pigment, 0.1 to 8% block copolymer, and 94 to 99.8% aqueous carrier medium and cosolvent, based upon the total weight of the ink composition.

4. The ink composition of claim 2, wherein the pigment comprises particles having a median particle size of approximately 0.01 to 0.4 micron.

5. The ink composition of claim 1, wherein said colorant is a dye and wherein said ink composition comprises approximately 0.01 to 20% dye, and 80 to 99.8% aqueous carrier medium and cosolvent, based on the total weight of the ink composition.

6. The ink composition of claim 1, wherein the cosolvent is represented by structure (1).

7. The ink composition of claim 1, wherein the cosolvent is represented by structure (2).

8. The ink composition of claim 1, wherein the cosolvent is represented by structure (3).

9. The ink composition of claim 1, wherein the cosolvent is represented by structure (4).

10. The ink composition of claim 1, wherein Y is:

11. The ink composition of claim 1, wherein Y is:

12. The ink composition of claim 1, wherein said cosolvent comprises 3-25% by weight of the total weight of the ink composition.

13. The ink composition of claim 1, wherein said cosolvent comprises 3-10% by weight of the total weight of the ink composition.

14. The ink composition of claim 1, wherein X is 50-100 mole per cent —H.

15. The ink composition of claim 1, wherein X is 80-100 mole per cent —H.

16. The ink composition of claim 6 wherein the cosolvent is the monoacetyl amide of a polyoxyalkyleneamine having the formula:

$$CH_3OCH_2CH_2O(CH_2CH_2O)_n[CH_2CH(CH_3)]_pCH_2CH(CH_3)NH_2,$$

where n=18 and p=3.

17. The ink composition of claim 9 wherein the cosolvent is a 1,3-disubstituted urea derived from two moles of a polyoxyalkyleneamine having the formula:

$$CH_3OCH_2CH_2O(CH_2CH_2O)_n[CH_2CH(CH_3)]_pCH_2CH(CH_3)NH_2,$$

where n=18 and p=3.

18. The ink composition of claim 1, further comprising a surfactant.

* * * * *